United States Patent

Hood

[11] Patent Number: 5,168,902
[45] Date of Patent: Dec. 8, 1992

[54] TUBE PLUGGING METHOD

[76] Inventor: Joy S. Hood, P.O. Box 3758, Plant City, Fla. 33564-3758

[21] Appl. No.: 659,011

[22] Filed: Feb. 22, 1991

[51] Int. Cl.$^5$ .............................. F16L 55/10
[52] U.S. Cl. ......................... 138/89; 138/90
[58] Field of Search .................. 138/89, 90; 215/360; 277/1; 220/235

[56] References Cited

U.S. PATENT DOCUMENTS

| | | | |
|---|---|---|---|
| 31,856 | 3/1861 | Wilson | 215/360 |
| 168,121 | 9/1875 | Adee et al. | 220/235 |
| 322,702 | 7/1885 | Ehrlich | 215/360 |
| 1,495,000 | 5/1924 | Cuthbertson | 215/360 |
| 2,155,491 | 4/1939 | Jacobs | 220/235 |
| 2,479,862 | 8/1949 | Payne | 215/360 |
| 2,616,582 | 11/1952 | Kappes et al. | 215/360 |
| 2,765,945 | 10/1956 | Hassid et al. | 215/360 |
| 2,886,067 | 5/1959 | Maxwell et al. | 215/360 |
| 2,977,992 | 4/1961 | Jensen | 138/89 |
| 2,993,616 | 7/1961 | Carlile et al. | 138/89 |
| 3,667,640 | 6/1972 | Morrow | 138/89 |
| 3,704,729 | 12/1972 | Tomlinson | 138/90 |
| 3,812,810 | 5/1974 | Moeller | 215/360 |
| 4,310,029 | 1/1982 | Dudek | 138/89 |
| 4,474,216 | 10/1984 | Noe | 138/89 |

*Primary Examiner*—James E. Bryant, III
*Attorney, Agent, or Firm*—Charles A. McClure

[57] ABSTRACT

Resilient stopper rings are inserted into a tubular conduit and are compressed endwise so as to expand outwardly against the conduit wall to block or stop flow or leakage of fluid from the conduit. In operation, axial spacing of stopper leading and trailing cylindrical end parts threaded together and sandwiching the rings is adjusted by a wrench to compress the rings to plug the conduit or alternatively to release the rings for removal of the stopper from the conduit.

3 Claims, 1 Drawing Sheet

TUBE PLUGGING METHOD

TECHNICAL FIELD

This invention relates to resilient stoppers, to their insertion into fluid conduits, and to resulting blocking or stopping of flow through such tubes, particularly where the stopper is initially larger across than the internal tubular cross-section to be plugged.

BACKGROUND OF THE INVENTION

Heat exchangers commonly include arrays of tubular conduits in parallel with one another and collectively between a fluid inside, at one temperature and pressure, and another fluid outside at an unlike temperature (and pressure). The tubular walls are designedly thin enough for ready heat conduction through them but thick enough to last through many cycles without leaking, as a leak incapacitates a heat exchanger sooner or later, usually rather promptly. Other tubular conduits, especially in chemical processing plants, contain noxious fluids capable of considerable damage and injury if released into their surroundings.

In the event of leakage of a tubular conduit whose physical integrity may have such undesirable consequences, efforts are often made to plug the leaking tube, whether to enable operations to continue operations, facilitate maintenance, protect the environment, save the contents (and money), etc. Plugging is complicated under any circumstances and is especially difficult where, as is common, the tubular interior is subjected at any time to a higher pressure than the exterior. A plug satisfactory at low pressure may leak or even be blown out at a higher pressure inside than outside.

Existing methods of attacking this problem focus upon inserting the smaller end of a tapered stopper manually into the bore of such tubular conduit and applying force to its larger end, usually intermittently as by hammering it, until a substantial part or all of the stopper has entered the bore. Unfortunately, such procedure can not lodge a stopper sufficiently tightly to preclude its subsequent dislocation and consequent leakage or outright expulsion at high fluid pressures applied to the plugging stopper from upstream. My invention deals with the foregoing problems and solves them.

SUMMARY OF THE INVENTION

A primary object of the present invention is to provide methods of plugging tubular conduits by compressing resilient ringlike members axially and thereby expanding them outward therein despite high pressures to be maintained in the conduits.

Another object of this invention is to provide resilient stoppers adapted for insertion by such methods to plug and unplug tubular conduits.

A further object of the invention is to provide apparatus adapted to accomplish the foregoing objects easily and economically.

In general, the objects of this invention are accomplished by providing a cylindrical stopper adapted to plug a surrounding tubular conduit within which the stopper initially fits slidably, comprising stopper end portions including a leading head member and a trailing base member spaced adjustably apart along a common longitudinal axis, circumferential resilient means between those two members and adjustment means threaded through the leading member and terminating in the trailing member and so interconnecting the two portions and adapted to vary such spacing of the leading and trailing members, being thereby adapted upon reducing such spacing to compress such circumferential resilient means axially and to bulge such resilient means outward from the axis into plugging contact with such surrounding conduit.

More particularly, a tube is plugged with such a cylindrical stopper by first adjusting the spacing of the leading and trailing portions so as to compress the circumferential resilient means enough to expand such means outward beyond the leading and trailing portions so as to rub against the conduit when inserted therewithin, sliding such stopper into such conduit with the leading and trailing portions so spaced and the resilient means rubbing, and reducing the spacing of the leading and trailing portions and thereby axially compressing such circumferential resilient means further, enough to force such resilient means outward into plugging contact with such surrounding tube.

Other objects of the present invention, together with means and methods for attaining the various objects, will be apparent from the following description and accompanying diagrams of preferred embodiments, which are presented by way of example rather than limitation.

DESCRIPTION OF THE INVENTION

Figure 1:
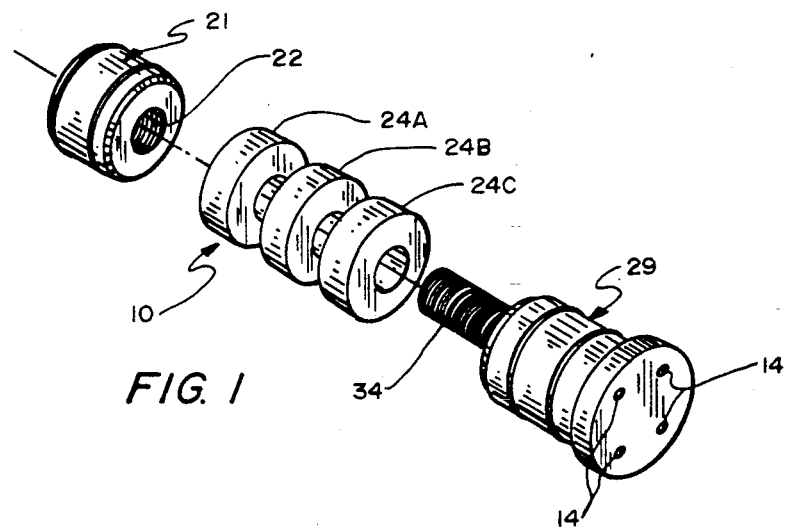
FIG. 1 is an exploded perspective view of a first embodiment of resilient stopper of this invention.

FIG. 1 shows stopper embodiment 10 of the present invention in an exploded perspective arrangement of coaxial parts, including two end portions and an interconnecting threaded portion, along their common longitudinal axis. Furthest from the viewer is leading end or head member 21 with bore 22 therethrough internally threaded and thereby adapted to accommodate externally threaded cylindrical intermediate member 34 therein. Closest to the viewer is trailing end or base member 29, from which externally threaded cylindrical intermediate member protrudes toward the leading end. Over most of the length of the trailing member its diameter matches that of the leading member, but it steps outward at its base into shoulder 29'. The base also has in its near face four small blind bores 14 spaced substantially equidistant from the axis and parallel thereto, such as inside the corners of an inscribed square (not indicated). Along and about the axis are several annular or washer-like resilient rings 24A, 24B, 24C, each with an outside diameter approximating the outer diameter of the head or leading member and an inside open diameter similar to (preferably slightly larger than) the outside diameter of the intermediate threaded member 30 shown next in line. The far or free end of such intermediate member is visible pointing away from the viewer, whereas its other end terminates in trailing member 29, either integral therewith as it appears here or concealed in a blind bore therein as shown in other views. The peripheral surfaces of the respective leading and trailing members have a plurality of ridges therearound—unnumbered.

Figure 2:
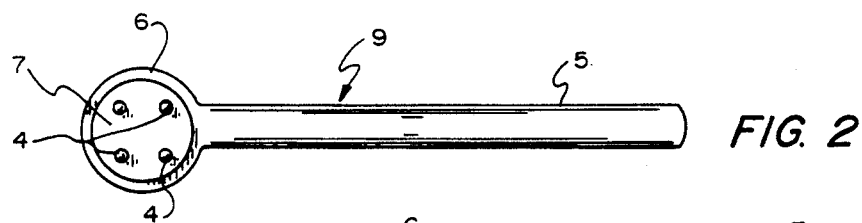
FIG. 2 is a rear end elevation of a wrench suitable for installing a stopper as shown in the preceding view.

FIG. 2 shows in rear elevation wrench 9, conveniently a ratchet wrench, having handle member 5 with annular end 6 enclosing ratchet head 7, as is conventional. The ratchet head carries four protruding pins 4 engageable with the corresponding blind bores (14) shown in stopper base member 29.

Figure 3A:
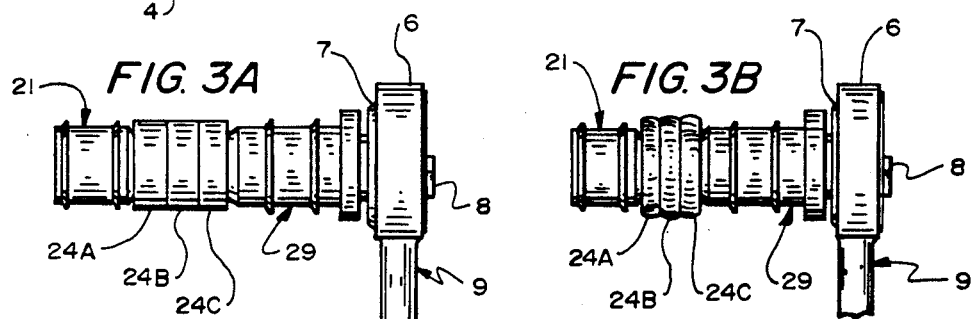
FIG. 3A is a side elevation of the stopper members of the preceding views assembled for use and with the wrench juxtaposed.
Figure 3B:
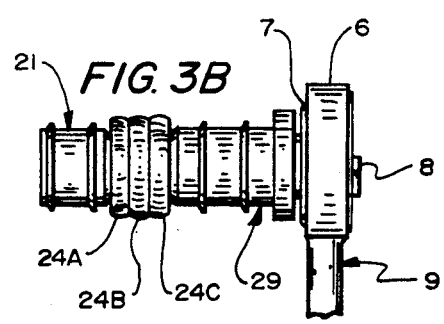
FIG. 3B is a side elevation quite similar to FIG. 3A, but with the stopper pre-compressed, ready for insertion into the conduit.

FIGS. 3A and 3B show, in side elevation, wrench 9 so engaged, whereupon rotation of the wrench is effective to turn the stopper, shown fully assembled, with resilient rings 24A, 24B, 24C between the leading and trailing end members. Also shown edgewise on the front of the wrench head at right is conventional ratchet-direction setting member 8. In FIG. 3A leading head member 21 and trailing base member 29 are spaced far enough apart that the resilient rings located therebetween are just snug, not yet pre-compressed, whereas in FIG. 3B the rings are shown pre-compressed, by shortening of the head-to-base spacing, bulging the rings outward beyond the head and base members. Pre-compression aids in fitting the stopper snugly by hand into the conduit to be plugged, and in this view the bulging is exaggerated beyond normal limits so as to be noticeable to the eye.

Figure 4A:
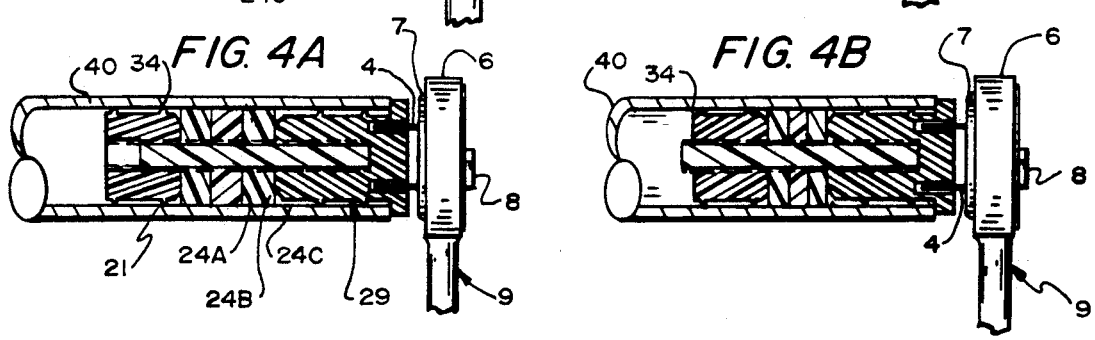
FIG. 4A is a side sectional elevation of the stopper of the foregoing views inside a tubular conduit but not plugging it.
Figure 4B:
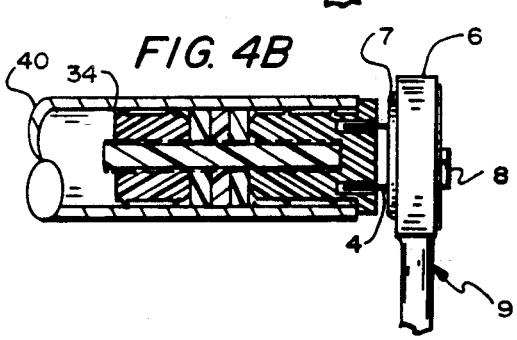
FIG. 4B is a sectional elevation similar to FIG. 4A but with the stopper in a tubular conduit, compressed and plugging it.

FIGS. 4A and 4B show, in side sectional elevation, stopper 10 inserted inside tubular conduit (or tube) 40, with shoulder 29' of the base of the stopper abutting the end of the tube. In FIG. 3A the resilient rings are just in frictional engagement with the inside wall of the tube, enabling the head member to remain stationary when turned with the wrench, thereby compressing the rings further. In FIG. 3B the resilient rings are narrowed even further and have bulged outward tight against the conduit wall, plugging the tube.

Figure 5A:
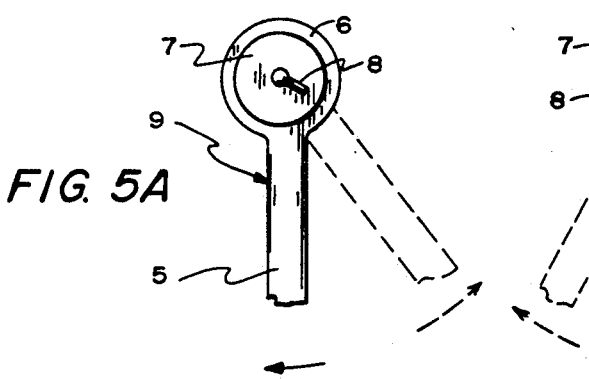
FIG. 5A is a front end elevation of such wrench, illustrating its motion in transitioning a stopper from FIG. 4A to FIG. 4B.
Figure 5B:
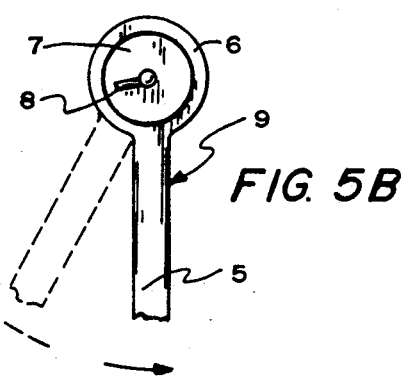
FIG. 5B is a front end elevation of such wrench, illustrating its motion in transitioning from FIG. 4B back to FIG. 4A.

FIGS. 5A and 5B show wrench 9, in front elevation, ahead of the end of tube 40 occupied by the stopper (not visible). Member 8 on the head of the wrench is switched rightward in FIG. 5A and leftward in FIG. 5B for setting the ratcheting direction as is conventional. In FIG. 5A positive wrench rotation is in the clockwise direction (solid arrow), corresponding to tighteneing of the stopper inside, whereas ratcheting occurs in the counterclockwise direction (broken arrow) of wrench movement. In FIG. 5B, however, positive action of the wrench is reversed, as again shown by such arrows. Here the solid arrow indicates how it is turned to decompress the rings of the installed stopper so as to loosen it for removal from the tube, whereas ratcheting occurs in the opposite or clockwise direction.

As is apparent from these diagrams, a stopper of this invention is assembled by sliding a desired number of resilient rings onto the threaded intermediate member and then threading it into the leading member until the rings are snug.

A manual pre-installation fitting is desirable—if a hazardous leaking tube does not preclude it. For a given tube, one or more stoppers can be inserted (and be removed) sequentially by hand, and a desirably close-fitting stopper be selected. Normally the selected stopper is then pre-compressed manually, with or without the aid of the wrench. The objective is to thread the base member onto the intermediate threaded member enough to bulge the resilient rings outward before insertion into the tube, just enough to assure sufficient frictional contact with the tube wall to hold the head member stationary when the base member is turned with the stopper inserted fully into the tube. If the leading or head member is hand-tight in the tube during a pre-installation fitting, but the trailing or base member remains loose enough to turn therein while the head member is stationary, the ring pre-compression step may be superfluous. Accordingly, the leading member is advantageously a bit larger in diameter than the insertable part of the trailing member to aid in assuring threading action as the wrench is turned. Alternatively, the base member may be made of a material with lower frictional coefficient than the head member, especially where tube diameter and inside wall condition are reliably sized and smooth.

After insertion of the selected stopper, with or without precompression, whichever is more appropriate under the circumstances, the wrench is engaged with the stopper base and is set for positive rotation clockwise (assuming a righthand thread). The wrench is turned so as to shorten the head-to-base spacing enough to bulge the rings outward tightly against the wall. When ordinary manual effort will not turn the wrench further, the rings should be sufficiently tight to plug the conduit completely and to resist removal under high pressure, upwards of several hundred pounds per square inch.

Experience shows such a diversity of tube sizes and conditions in the field that a goodly range of stopper sizes is preferable to relying solely upon pre-compression of the resilient rings to make up for a mis-match in diameters. Leaking tubes often pose hazards that demand prompt and effective plugging rather than time-consuming on-site experimentation in pre-compression or stopper selection.

If it becomes desirable to reopen a plugged tube, the stopper may be decompressed by engaging the base member with the wrench, and turning the wrench in the opposite (usually counterclockwise) direction. Such turning backs the base member away from the head member, enabling the rings to relax their grip on the inside wall of the tube. When enough of the base member becomes available to get a good grip on it the stopper usually can be pulled out easily enough. However, when the rings adhere tightly to the wall of the conduit, other measures may be employed readily enough.

If the base and the intermediate members are made in one piece (i.e., integral or unitary), they may be unscrewed completely from the head member (and rings), and a metallic puller or extractor be threaded into the head member to remove it (and the rings). If the intermediate member is threaded into a blind bore in the base member, unscrewing of the base member permits its removal, whereupon a puller with a long threaded metal sleeve may be threaded onto the intermediate member for enough length to enable it and the head member (and rings) to be removed. In predictably difficult cases the intermediate member may itself be made of metal to eliminate possible breakage o thread stripping of plastic intermediate members.

The ability to remove such an effective plug is a big advantage in instances where the plugged tube may be one of many in a countercurrent reactor or a heat-exchanger that has so many tubes plugged that it is taken out of service, plugs removed, and refurbished.

The various chemical and physical characteristics of stopper embodiments may be mixed or matched as desired to cope with whatever fluid composition, pressure, or temperature, or whatever tubular conduit roughness or smoothness, size, or temperature may be encountered. Higher pressures require tighter fit of the stoppers, of course, to prevent being dislodged. Preloading and harder compositions are conducive to improvement in plugging at higher pressures.

The intermediate threaded member may be made of the same composition as the base and/or head members—which may be alike or not. Alternatively, as suggested above, the intermediate threaded member may advantageously be composed of a metal, such as stainless steel.

Normally the stoppers may be made of natural or synthetic rubber, or indeed any of many thermosetting or heat-resistant polymeric materials, with or without fibrous reinforcement. Examples include acetals, aramides, epoxies, polyamides, polyesters, polysiloxanes, and melamine-formaldehyde or phenol-formaldehyde resins.

Although the stoppers illustrated here are round in transverse section, bores with other cross-sections (e.g., square or other polygonal) may be plugged also. Indeed, polygonal bores with a half dozen or more sides usually may be plugged effectively with stoppers having a round transverse cross-section.

The wrench or similar means for rotating the trailing member to tighten or loosen the stopper, and the outer face of such member may interfit differently from the four matching pins and bores as shown. Thus, a single square or hex drive and bore may be substituted, or the shoulder on the base can be formed with a polygonal outline to match a square or hex drive socket, for example.

Variations in stopper structure and use have been suggested above. Other modifications may be made, as by adding, deleting, combining, or subdividing parts or steps, while retaining at least some of the advantages and benefits of the invention—which itself is defined in the following claims.

The claimed invention:

1. Method of installing a cylindrical stopper into a conduit to plug the conduit therewith, comprising the steps of forming cylindrical coaxial leading and trailing stopper members adapted to fit slidably within a conduit to be plugged, boring axially through the leading member and boring axially partway into the trailing member from its leading face and threading the resulting through bore and blind bore, and providing gripping means on the unbored trailing face of the trailing member;

providing a rod adapted to thread through the bore in the leading member and to thread into the blind bore in the trailing member, and locating between the leading and trailing members resilient ring means adapted to fit about the rod when so threaded from the leading to the trailing member, and adapted—when not compressed axially—to fit slidably within the conduit to be plugged and—when compressed axially—to expand against the inside wall of the conduit and thereby to plug the conduit when so expanded;

inserting the threaded rod into and through the bore of the leading member and through the resilient ring means and to the bottom of the blind bore in the trailing member, preliminarily adjusting the spacing of the leading and trailing stopper members on the rod so as to compress the resilient ring means sufficiently to expand such means outward beyond the leading and trailing members so as to rub against the conduit wall when inserted therewithin; and sliding such stopper into such conduit with the leading and trailing members so spaced until most of the trailing member is within the conduit, then further reducing the spacing of the leading and the trailing members by rotating the trailing member to thread the rod through the leading member and thereby axially compressing such resilient ring means sufficiently to expand such means outward into plugging contact with the conduit wall.

2. Method of installing a cylindrical stopper having variably spaced leading and trailing members with resilient ringlike members therebetween into a conduit to plug it, comprising steps of assembling the leading and trailing members with the ringlike members therebetween on a threaded rod extending axially through a threaded bore in the leading member and into a threaded blind bore in the face of the trailing member whose trailing face has means thereon adapted to be gripped to rotate the trailing member, sliding such stopper into such conduit with the leading and trailing members spaced apart so that reduction in their spacing will compress the resilient ringlike members axially and thereby bulge them outward beyond the leading and trailing members, and then reducing the spacing of the leading and trailing members by rotating the trailing member to thread the rod further through the leading member, thereby axially compressing such resilient ringlike members sufficiently to force them outward against and into plugging contact with such surrounding conduit.

3. Method according to claim 2, including as a preliminary step reducing the axial spacing of the leading and trailing members somewhat and thereby pre-compressing such resilient ringlike members sufficiently to force them outward so that they engage the conduit wall in frictional contact therewith whenever inserted therewithin.

* * * * *